(12) United States Patent
Christopher, Jr. et al.

(10) Patent No.: US 9,725,286 B1
(45) Date of Patent: Aug. 8, 2017

(54) APPARATUS AND METHOD FOR COLLAPSIBLE VEHICLE JACK STAND

(76) Inventors: Kenneth W Christopher, Jr., Dripping Springs, TX (US); Frank C Ceravolo, Dripping Springs, TX (US); Mark W Winkler, Dripping Springs, TX (US)

( * ) Notice: Subject to any disclaimer, the term of this patent is extended or adjusted under 35 U.S.C. 154(b) by 942 days.

(21) Appl. No.: 13/477,817

(22) Filed: May 22, 2012

(51) Int. Cl.
*B66F 3/00* (2006.01)
*F16M 11/26* (2006.01)
*F16M 11/24* (2006.01)

(52) U.S. Cl.
CPC .............. *B66F 3/00* (2013.01); *F16M 11/24* (2013.01); *F16M 11/26* (2013.01)

(58) Field of Classification Search
CPC ........ B66F 13/00; B66F 7/0691; A47B 3/087; A47B 9/16; F16M 11/242; F16M 11/26
USPC .................. 248/528, 529, 352, 354.5–354.7; 254/10 B, 122, 124, 126, 127, 2 B, 49, 254/8 R, DIG. 1, DIG. 2, DIG. 4
See application file for complete search history.

(56) References Cited

U.S. PATENT DOCUMENTS

| | | | | |
|---|---|---|---|---|
| 1,457,009 A | * | 5/1923 | Starik | 254/126 |
| 1,514,893 A | * | 11/1924 | Carlson | 254/126 |
| 1,810,726 A | * | 6/1931 | Pierce | 248/352 |
| 2,022,636 A | * | 11/1935 | Faucett | B66F 13/00 254/1 |
| 2,121,861 A | * | 6/1938 | Dickerson | 254/126 |
| 2,127,398 A | * | 8/1938 | Freeman | A47C 4/26 108/131 |
| 2,829,936 A | * | 4/1958 | Anderson | A47B 9/16 108/117 |
| 3,305,876 A | * | 2/1967 | Hutt | 5/11 |
| 3,313,505 A | * | 4/1967 | Petrie | B25H 1/00 211/191 |
| 3,645,501 A | * | 2/1972 | Musgrove | 254/126 |
| 3,802,658 A | * | 4/1974 | Binding | B66F 1/04 248/352 |
| 3,854,750 A | * | 12/1974 | Voehringer, Jr. | 280/764.1 |
| 3,920,212 A | * | 11/1975 | Westwood | B66F 13/00 248/346.01 |
| 3,970,278 A | * | 7/1976 | Studer | B66F 13/00 248/165 |
| 4,009,855 A | | 3/1977 | Hoffmann | |
| 4,014,517 A | * | 3/1977 | Keagle | B66F 13/00 248/157 |
| 4,021,012 A | * | 5/1977 | Miller | B66F 19/00 248/161 |
| 4,141,526 A | | 2/1979 | John | |

(Continued)

*Primary Examiner* — Larry E Waggle, Jr.
*Assistant Examiner* — Tyrone V Hall, Jr.
(74) *Attorney, Agent, or Firm* — Rick B. Yeager

(57) ABSTRACT

A jack stand apparatus for use with commonly available jacks, particularly for vehicles with insufficient surface area for both jacks and jack stands to be used on the specified lifting points. In one embodiment, the jack stand comprises an axle assembly, a lift pad assembly, a plurality of height adjustable leg assemblies where the leg assemblies may be rotated with respect to the axle assembly, and a leg locking mechanism. In one embodiment, the foldable device is collapsed into a planar orientation, and positioned on top of a jack's lifting plate; passed under the vehicle, including low profile and limited clearance vehicles. Once the apparatus and vehicle are lifted with the jack, the legs of the apparatus are locked into position to support the lifted vehicle, and the jack is safely removed.

6 Claims, 13 Drawing Sheets

(56) References Cited

U.S. PATENT DOCUMENTS

| | | | |
|---|---|---|---|
| 4,245,808 A | 1/1981 | John | |
| 4,330,104 A | 5/1982 | Klok | |
| 4,534,544 A * | 8/1985 | Heide | B66F 7/0625 |
| | | | 182/141 |
| 4,553,727 A | 11/1985 | Arzouman | |
| 4,681,299 A * | 7/1987 | Siebert | 254/8 R |
| 4,811,924 A | 3/1989 | Walters | |
| 4,856,747 A | 8/1989 | Gano | |
| 4,882,932 A * | 11/1989 | Corghi | G01M 1/28 |
| | | | 254/122 |
| 5,110,089 A | 5/1992 | Slay | |
| 5,165,665 A | 11/1992 | Jolivette | |
| 5,180,131 A | 1/1993 | Few | |
| 5,205,586 A * | 4/1993 | Tallman | 280/764.1 |
| 5,228,651 A | 7/1993 | Warner | |
| 5,297,779 A | 3/1994 | Collins | |
| 5,465,673 A * | 11/1995 | Ma | A47B 3/02 |
| | | | 108/118 |
| 5,505,524 A * | 4/1996 | Drumwright | 297/440.24 |
| 5,520,360 A | 5/1996 | Wensman | |
| 5,901,935 A * | 5/1999 | Lai | F16M 11/046 |
| | | | 248/354.1 |
| 5,915,672 A * | 6/1999 | Dickey | B66F 3/24 |
| | | | 248/352 |
| 6,443,413 B1 | 9/2002 | Hawkins | |
| 6,644,615 B1 | 11/2003 | Liu | |
| 6,942,196 B1 * | 9/2005 | Andrews | B66F 3/00 |
| | | | 254/127 |
| 7,147,211 B2 | 12/2006 | Porter | |
| 7,584,568 B1 * | 9/2009 | Brownlee | F41C 23/16 |
| | | | 42/94 |
| 7,810,788 B2 * | 10/2010 | DeVries | 254/126 |
| 7,878,482 B2 | 2/2011 | Hernandez | |
| 8,132,787 B1 | 3/2012 | Audet | |
| 8,616,514 B1 * | 12/2013 | Baxter | B25H 1/0014 |
| | | | 108/147.21 |
| 2007/0114500 A1 * | 5/2007 | Hernandez, Jr. | B66F 3/24 |
| | | | 254/1 |
| 2007/0200102 A1 * | 8/2007 | Hernandez, Jr. | B66F 3/30 |
| | | | 254/1 |

\* cited by examiner

APPARATUS AND METHOD FOR COLLAPSIBLE VEHICLE JACK STAND

CROSS-REFERENCE TO RELATED APPLICATIONS

This US non-Provisional patent application is related to U.S. Provisional Patent Application No. 61/519,465 filed by applicants on May 23, 2011 and claims the priority of that provisional application filing date.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND

Field of Invention

The current invention generally pertains to an apparatus and method of use in the lifting and safely securing of an object (e.g., vehicle) in a lifted state.

BRIEF SUMMARY OF THE INVENTION

One aspect of the current invention is a jack stand apparatus that allows the user to lift a vehicle, or other object, and hold it in the lifted position, thereby allowing the removal of the jack used for lifting. In one embodiment, both the jack and jack stand apply their lifting force to the same point on the object. Additionally, the apparatus collapses so that its vertical height is minimal.

In one embodiment, a method of use for the device is to place the collapsed apparatus on the jack's lifting plate; push the jack and apparatus under the vehicle or other object; jack the apparatus up; thereby lifting the object on top of the apparatus; lock the apparatus legs into position and then safely remove the jack, leaving the lifted object secured in the lifted position.

By using the apparatus between the jack and the object being lifted, both the jack and jack stand apparatus can be used in the same lifting point on the object, thereby eliminating the requirement to find both a jacking point and a jack stand point when lifting an object.

Previously, with many objects, especially vehicles, the only way to use both a jack and jack stand was to use one or the other in a location that violates the design criteria of the object. For vehicles that have designed-in lifting/jacking points, the apparatus only applies lifting force, or a supporting force, to the designed lifting points.

For vehicles with designed-in lifting/jacking points that do not provide sufficient surface area for the simultaneous use of a jack and jack stand, the apparatus and method described allow the use of both a jack and jack stands to apply lifting force in unison onto a single spot (i.e., the designed lifting spot) and to secure the object in the lifted position.

The apparatus can be built specific to a single jack or jack height or can be constructed to accommodate a wide range of jack sizes and lifted heights.

DETAILED DESCRIPTION OF EMBODIMENT—FOLDABLE, ADJUSTABLE JACK STAND TO SHARE VEHICLE LIFT POINT WITH JACK

Figure 1:
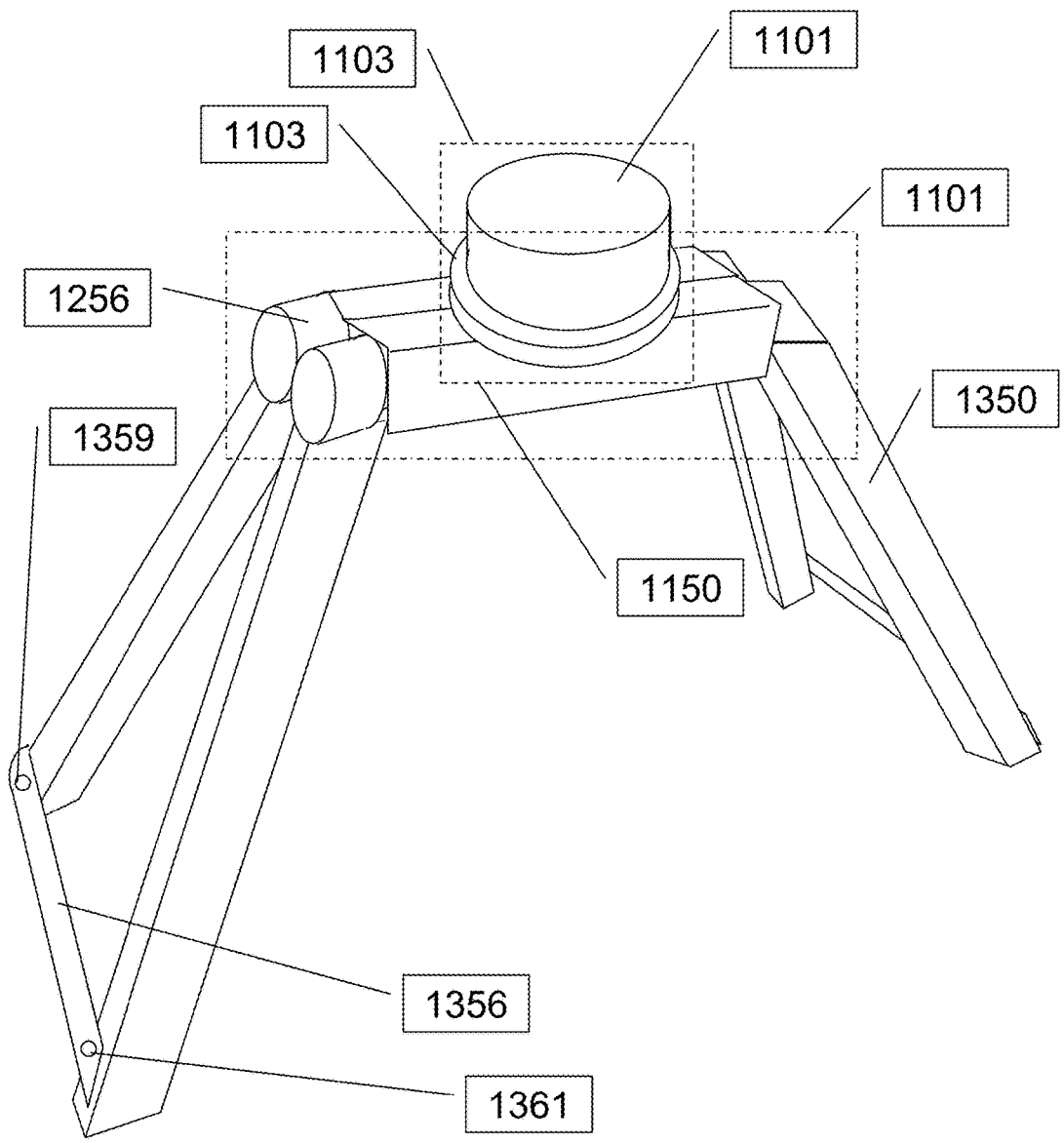
FIG. 1 is a front perspective view of a first embodiment apparatus in an "in use" configuration.

Referring to FIG. 1, which is a perspective view of an embodiment of the current invention, an apparatus 1000 comprises a lift pad assembly, an axle assembly; and leg assemblies. In this embodiment, the axle assembly comprises a housing with a lower portion and an upper portion. One or more axles are provided in the housing to facilitate the rotation of legs between a substantially flat or planar orientation, a folded storage orientation, and an erect orientation. The lower portion of the housing is typically placed on a jack, and the upper portion of the housing supports a lift pad which engages a vehicle lift point or other object. The jack is used to elevate the vehicle or object, and the legs are rotated to an erect position so that they can support the axle assembly. The jack may then be lowered and removed so that the vehicle is supported in an elevated position.

In the preferred embodiment, the lift pad assembly 1100 comprises a lift pad 1101, a lift pad ring 1103, and the lift pad base 1104. The lift pad assembly engages the object, typically a vehicle, that is being lifted and held in the lifted position by the apparatus 1000. In alternate embodiments, the lift pad assembly 1100 may be just a lift pad 1101 or a lift pad 1101 and lift pad ring 1103 or a lift pad 1101 and lift pad base 1104. Further in alternate embodiments, the lift pad assembly may be absent and the top surface of the axle assembly 1100 may be the lifting surface of the apparatus 1100.

This embodiment comprises a simple axle assembly 1200 which connects the lift pad assembly 1100 with the leg assembly 1350. In this embodiment, the axle assembly is the location where a jack applies force to raise the apparatus 1000 and the item (e.g., vehicle) that will be held in the lifted position by the apparatus 1000.

In other embodiments, a complex axle assembly 1250 provides the same function as the simple axle assembly 1200 but may be chosen for manufacturing, marketing, aesthetics, cost or operational reasons.

In this embodiment, the apparatus 1000 comprises four leg assemblies.

The leg assemblies 1350 support the simple axle assembly 1200 or the complex axle assembly 1250, and thereby support a vehicle or object being lifted in a fixed, raised position so that the jack can be removed while the apparatus 1000 remains erected and the object remains in the lifted position.

Several alternate designs, arrangements, articulations, materials, connections and interactions described below. Other variations will be apparent to those skilled in the art, and the invention is not limited to the specific examples described below.

Lift Pad Assembly

In this embodiment, The lift pad assembly 1100 comprises a lift pad 1101, a lift pad ring 1103 and a lift pad base 1104. Additional components may be added as necessary to resolve operational issues or improve usability.

The lift pad 1101 engages the object, such as a vehicle, to be lifted and provides the necessary padding between the apparatus 1000 and the object being suspended by the apparatus 1000. The lift pad 1101 can be constructed of multiple materials, including, but not limited to, metal, composites, rubber, silicone, or any durable material that can provide the necessary support and padding. It can also be constructed in different form factors allowing engagement of various object designs (e.g., flat top for lifting flat bottomed objects such as car body pans or specific lifting points, dished top for lifting round objects such as axle housings, slotted top for lifting unibody stiffened edges, cone shaped to fit specifically designed lifting points, "V" notch to support smaller round or angled edges such as torsion bars, etc). The material/padding prevents damage due to marring, and assists in keeping the suspended object from slipping off of the apparatus. There are multiple methods for attaching the lift pad 1101 to the axle housing 1150, including, but not limited to, an adhesive, stud, bolt, loop & hook fasteners, etc The lift pad base 1104 is an optional platform onto which the lift pad 1101 rests. It may be constructed of multiple materials, including but not limited to steel, aluminum, composites or other suitable materials. It provides support to the lift pad 1101, and is also the point of the lift pad assembly 1100 that may be attached to either the simple axle assembly 1200 or the complex axle assembly 1250.

The lift pad ring 1103 is affixed to, and surrounds the circumference of, the lift pad base 1104, and can be constructed of multiple materials, including, but not limited to, steel or aluminum, composites or other suitable material. It provides lateral support to the Lift Pad 1101, which fits within the circumference of the lift pad ring 1103. The lift pad 1101 can also be held in place by crimping the lift pad ring 1103 to the lift pad 1101 as an alternative to other fastening methods.

In some examples, the lift pad assembly 1100 is attached to the axle assembly in a fixed position at various locations along the simple axle assembly 1200 or complex axle assembly 1250, such as in the middle of the assembly, or closer to an end of the assembly.

In other examples, the lift pad assembly 1100 moveable via various mechanisms to either fixed points, such as specific locations with attachment mechanisms, or anywhere along an allowed range, such as with a sliding arrangement.

In various examples, the tilt/rotation of the lift pad assembly 1100 with respect to the simple axle assembly 1200 or complex axle assembly 1250 is at a fixed angle, such as parallel to the top of the simple axle assembly 1200 or complex axle assembly 1250, or at a 10° angle to the top of the simple axle assembly 1200 or complex axle assembly 1250, etc; at a moveable angle; or combinations of fixed and moveable angles. In some examples, the tilt/rotation angle may be set along any axis.

Axle Assembly

The simple axle assembly 1200 or complex axle assembly 1250 comprises axle Housing(s) 1150, and axle tube(s) 1201 or axle core tube(s) 1250. Additional components may be added as necessary to resolve operational issues or improve usability.

The axle housing 1150 may be a hollow tube, or tubes, and may be constructed in various shapes and of various materials, including, but not limited to, steel, aluminum, composites or other suitable materials. The lift pad assembly 1100 is affixed to and on top of the axle housing 1150.

The axle housing 1150, when in a configuration of two or more housings, may have an axle housing strengthener 1154, or axle housing spacer 1155, that is fixed between two or more axle housings 1150, and provides additional strength, a wider platform for the lift pad assembly 1100 and/or a gap between the axle housings 1150 which will allow free movement of the leg assembly 1350 (explained further below). A space or slot can permit the lift pad assembly 1100 to be moveable as described earlier.

The axle tube(s) 1201 or axle core tube(s) 1250 may be either hollow, solid or of various core configurations. The axle tube may be designed in various shapes, and is rotatable within the axle housing 1150.

An axle tube 1201/axle housing 1150 combination, or axle core tube 1250/axle housing 1150 combination may be constructed from a single piece of material with the axle tube 1201 or axle core tube 1250 shaped or formed onto the end of the combined unit. Two or more axle tube 1201/axle housing 1150 combinations, or axle core tube 1250/axle housing 1150 combinations, may be formed from a single piece of material with the axle tubes 1201 or axle core tubes 1250 shaped or formed on the end of the combined unit. In this configuration, the leg components of the leg assembly 1350 will move independently and the front and rear leg pairs will not move together as one.

In various examples, the apparatus 1000 may contain a single axle tube 1201 or axle core tube 1250, or multiple axle tube(s) 1201 or axle core tube(s) 1250. multiple axle tube(s) 1201 or axle core tube(s) 1250 provide a strength advantage over a single axle design as they share the burden of applied weight. Especially for short objects that will be held in a sloped position, multiple axle tube(s) 1201 or axle core tube(s) 1250 allow for a greater lifting angle because the apparatus 1000 is shorter than a single axle design. The multiple axle tube(s) 1201 or axle core tube(s) 1250 design provides a narrower profile which allows the apparatus 1000 to take up less space under the supported object, and allows the supported object to attain a sharper angle to the apparatus 1000 without coming in contact with any part of the apparatus 1000 other than the lift pad 1101.

The ends of the axle tube(s) 1201 or axle core tube(s) 1250 may be made to various shapes, including, but not limited to, squared, rounded or angled. Angled ends again provide a somewhat narrower profile, which allows the supported object to attain a sharper angle to the apparatus 1000 without coming into contact with other parts of the apparatus 1000 other than the lift pad 1101.

In various examples, the axle tube(s) 1201 or axle core tube(s) 1250 may have one or more pins through it, or posts attached to it, and protruding outwards so that the pin(s) or post(s) travels in slot(s) in the axle housing 1150 to stop the rotation of the axle at specific points. One example would stop the rotation of the axles at the point where the leg latches 1356 drop into place to make setup easier for the user.

Similarly, the axle housing 1150 may have pin(s) or post(s) protruding inward that travel in a slot or groove in the axle which stop the rotation of the axle at specific points. The axle tube(s) 1201 or axle core tube(s) 1250 may also have a locking hole drilled through the axle housings 1150 and axle tube(s) 1201 or axle core tube(s) 1250.

The axle housings 1150 may have shaped/notched/recessed ends that allow protrusions on the axle cuffs 1256 to travel within the shaped/notched/recessed ends, thereby stopping the axle tube(s) 1201 or axle core tube(s) 1250 rotation at specific points. Such shapes/notches/recesses may be covered to eliminate pinch points for the users.

Alternate embodiments of the axles could be constructed without a rotating axle within an axle housing. In such embodiments the legs could be attached to the axle housing or axle tubes with hinges, compound hinges that allow rotation in multiple dimensions or ball joints.

The axle housings 1150 may also have cables and/or sprockets/gears that allow the legs of the apparatus 1000 to be synchronized in movement.

In one example, cable synchronization requires a pair of opposing axle synchronization cables 1302 at opposite ends of the axles in order to sync in both directions. In some examples, axle synchronization cables 1302 can be positioned between the axle cuffs 1256 and axle housings 1150. In other examples, axle synchronization cables can be positioned on the axle cuffs 1256, provided there is a groove in the axle cuff 1256 where the axle synchronization cables 1302 travel to make clearance between the axle cuffs 1256.

Axle synchronization gears/sprockets 1301 may only be required at one end, and can be either gears or rougher sprockets. Axle synchronization gears/sprockets 1301 can be positioned at either end, but only one set may be required. Axle synchronization gears/sprockets 1301 can be positioned between the axle cuffs 1256 and the axle housings 1150 or the axle cuffs 1256 can be manufactured such that they are the axle synchronization gears/sprockets 1301 (e.g., both castellated at the axle housing 1150 end with the castellations bent out on one so that they engage the slots in the other). Number of "teeth" is not a significant factor, though there should be enough to allow for smooth rotation and not so many as to become a manufacturing burden or so small as to become weak.

The axle synchronization gears/sprockets 1301 and/or axle synchronization cables 1302 may be covered and/or enclosed.

The spring loaded plunge 1151 can be positioned anywhere along the axle housing 1150 if it is to engage (i) a hole in the axle, (ii) a slot in the axle or (iii) either a hole or slot in the larger diameter portion of the complex axle assembly 1250—the left half or right half in FIG. 9. The spring load is preferably selected such that at rest the spring loaded plunge 1151 is down or inserted, not up or withdrawn. Pulling the spring loaded plunge 1151 out allows the leg assembly 1350 to rotate, and when either the complex axle plunge pin stored position hole 1254/complex axle plunge pin In use position hole 1255/simple axle plunge pin stored position hole 1203/simple axle plunge pin in use position hole 1204 rotates beneath the pin end of the spring loaded plunge 1151, the spring loaded plunge 1151 automatically snaps in to stop the rotation of the leg assembly 1350.

There are other ways of stopping the rotation of the leg assembly 1350 at the almost horizontal position including pins, clasps and/or other mechanisms that fix the rotational position of any one leg with respect to the axle housing 1150. Since the rotation of the axle tube(s) 1201 or axle core tube(s) 1250 is synchronized, fixing the position of one leg fixes the position of all legs.

When the apparatus 1000 is in the collapsed position, and resting upon the jack, the leg assembly 1350 may be locked at such an angle that the ends of the legs, or feet 1360, do not come into contact with the surface upon which the jack is placed, but at such an angle that would allow access to the axle housing 1150.

Leg Assemblies

In this embodiment, each leg assembly 1350 comprises axle cuffs 1256, upper legs 1351, lower legs 1353, feet 1360 (or the leg ends) and leg latches 1356. Additional components may be added as necessary to resolve operational issues or improve usability.

The axle cuffs 1256 are the components which attach the legs to the axle tube(s) 1201 or axle core tube(s) 1250. The axle cuffs 1256 may be attached to the legs and axle tube(s) 1201 or axle core tube(s) 1250 by a single method, or by any combination of the following methods:

Adhesive—a glue or other chemical attachment between the axle cuffs 1256 and axle tube(s) 1201 or axle core tube(s) 1250.

Pin—a fastener, such as a metal pin, screw or bolt, that passes through the axle cuffs 1256 and the axle tube(s) 1201 or axle core tube(s) 1250.

Spot welds—simple spot welds of the axle cuffs 1256 to the axle tube(s) 1201 or axle core tube(s) 1250.

Through spot weld—drilling through the axle cuffs 1256 and partially through the axle tube(s) 1201 or axle core tube(s) 1250 and then filling in the hole with welding. This method provides greater strength that either the pin or spot weld connections.

Circumference weld—at the end of the axle and axle cuffs 1256, weld the axle cuffs 1256 to the axle tube(s) 1201 or axle core tube(s) 1250 partially, or fully, around the axle cuffs 1256 circumference.

Slice weld—similar to the through-spot weld, but rather than drilling a hole through the axle cuff 1256 and into the axle tube(s) 1201 or axle core tube(s) 1250, grind or otherwise cut a slice partially around the circumference of the axle cuff 1256, penetrating into but not through the axle tube(s) 1201 or axle core tube(s) 1250 and then filling the "slice" with welding.

Combinations—use of two or more of these or other methods to attach the axle cuffs 1256 to the axle tube(s) 1201 or axle core tube(s) 1250.

The embodiment of FIG. 1 uses a combination of attachment methods, including through-spot weld and circumference weld.

The axle cuffs 1256 may be square, rounded, and/or deliberately misaligned to achieve uniformity and levelness when the apparatus 1000 is in the open position.

The outer sides of the axle cuffs 1256 may also be beveled, as well as the outer edges of the axle tube(s) 1201 or axle core tube(s) 1250 which fit inside the axle cuffs 1256, to further maximize the portability of the apparatus 1000, and to help prevent the edges of the apparatus 1000 from coming into contact with the underside of the vehicle that is being supported by the apparatus 1000, particularly when the vehicle is at an angle to the apparatus 1000 during the lifting process and/or while the vehicle is being supported by the apparatus 1000.

The leg stops 1362 may be implemented to prevent, or limit, lateral or rotational shifting of the apparatus 1000 under weight. Leg stops 1362 may be fixed anywhere on the apparatus 1000 in the manufacturing process, and constructed in different sizes, in order to limit tilt, or they may be placed to eliminate tilt. Additionally, leg stops 1362 help position the leg assembly 1350 in their approximate "in use" position to make actuating the leg latches 1356 easier.

The leg cuffs 1362 may be shaped on the axle housing 1150 end to provide a nub or protrusion that travels within a notch, slot or recess in the end of the axle housing 1150 thereby limiting the rotational travel of the leg assembly 1350 to specific points.

The components of the leg assembly 1350 may be manufactured of a variety of materials, including, but not limited to, steel, aluminum, composites or other suitable material. They may each be single pieces, or of multiple pieces capable of telescoping or extending by various methods, including but not limited to stacking, attaching, nesting, threading, etc. The upper legs 1351 and lower legs 1353 may be square, rounded or another shape, and may be compromised of multiple shapes. Extensible leg assemblies 1350 may have lower legs 1351 that are larger or smaller in size than the upper legs 1351, so that the lower portion may be nested within the larger portion, or vice versa; the extension may "telescope" two or more sections that nest inside each other. The overlapping upper legs 1351 and lower legs 1353 may be adjusted to single or multiple fixed, or continuously variable, positions and may be held in place by various mechanisms, buttons, clevis pins, detent pins, quick release pins, locking quick release pins, locks, pegs, bolts or by other means.

The extension may rotate so that it threads into and out of the upper portion. They may be attached to the axle cuffs 1256 in a parallel fashion and/or deliberately misaligned to achieve uniformity and levelness or parallel alignment of the legs when they are in the "in use" position. The upper legs 1351 and lower legs 1353 may be square (aligned) to each other when the apparatus 1000 is open or not.

The feet 1360 are optional and may be manufactured in a variety of shapes, and of a variety of materials, including, but not limited to, steel, aluminum or other suitable materials. They are attached to the ends of the leg assembly 1350, and provide added stability and prevent marring of surfaces underneath the apparatus 1000, i.e., garage floor.

The feet 1360 may be the larger, smaller, or of the same size as the ends of leg assembly 1350.

Optionally, the bottoms of the feet 1360 may be machined to increase the friction between the feet 1360 and the surface the apparatus 1000 is resting on. The feet 1360 may also have an optional coating of rubber or other suitable material that will increase the friction between the feet 1360 and the surface the apparatus 1000 is resting on.

The feet 1360 may also include wheels, or have wheels in their place, to assist in making the opening and closing of the apparatus 1000 easier, and to help prevent marring to the surface upon which the apparatus 1000 is resting. One or more feet 1360 may have wheels, and one or more of these wheels may have a locking mechanism to prevent the apparatus 1000 from rolling out of position.

Optionally, the bottom ends of the leg assembly 1350, near or at the feet 1360, may be tied together through various mechanical means (e.g., cables, chains, tie bars, etc) as reinforcement to prevent their spreading under load.

Leg Locking Mechanism

In FIG. 1, the leg assembly 1350 of the apparatus 1000 has multiple legs. For the purpose of the following descriptions, references will be made to mechanisms involving their connections between two of the legs at one end of the apparatus 1000, such connection holding the two legs in the "in use" position and preventing the collapse of the apparatus 1000. From a practical and ease of use standpoint, the leg locking mechanism at each end of the apparatus 1000 may be the same.

The leg locking mechanism may be placed anywhere along the legs, and may be comprised of various components and methods, including, but not limited to:

Pivoting lock bars mechanism—these mechanisms are simple bars or "latches" that are attached to one leg and can be connected to the other leg when the apparatus is in the "in use" position, or disconnected for the apparatus to be folded or flattened. Each pivoting lock bar (one on each end of the apparatus to connect the two legs at that end) consists of:

Leg latch rotational pins 1359—one end of the leg latch 1356 is attached to one leg by a pin or bolt that allows the leg latch 1356 to rotate around the attachment.

Leg latch 1356—the bar or "latch" that pivots around one end with a fixed attachment to one leg and engages or connects to the other leg through one of a variety of releasable connections to the other leg. The releasable connections could be one of the following mechanisms, although other mechanisms can be used as well:

Leg latch lock pin 1361—a pin that passes through the leg latch 1356 and through the leg. The leg latch lock pin 1361 may or may not incorporate one of a variety of industry standard locking mechanisms to hold it in place.

Leg latch rotational pin 1359—a pin or other fixed protuberance on the free leg that allows the leg latch 1356 to be attached or connected to the leg. The leg latch rotational pin 1359 is a shaft extending out the side of the leg with a larger diameter head at its end. The leg latch 1356 can be attached to the leg latch lock pin 1361 by a variety of methods, including but not limited to:

Leg latch engagement slot 1358—the leg latch 1356 has a short notch cut into on side that allows the leg latch 1356 to be hooked onto a leg latch lock pin 1361. The notch should be angled forward away from the pivoting end of the leg latch 1356 so that when engaged pressure forcing the legs apart will hold the leg latch engagement slot 1358 firmly into the notch.

Keyhole latch bar—the leg latch 1356 has a "keyhole" cut or formed into it, a hole large enough to pass over the head of a leg latch lock pin 1361 with a slot extending forward away from the pivoting end of the leg latch 1356 that is wide enough to accommodate the shaft of the leg latch lock pin 1361 but narrow enough that the head of the leg latch lock pin 1361 cannot pass through the slot.

Sliding cuff 1363—this mechanism is comprised of two cuffs, one on each leg, with said cuffs just large enough to be able to slide up and down the legs. The sliding cuffs 1363 can be attached to each other through a variety of mechanisms, including but not limited to: bars, chains or cables. The cuff attachment mechanisms must pivot or otherwise be flexible enough to allow the orientation of the sliding cuffs 1363 and attachment mechanisms to vary so that the legs can be extended or folded as necessary to operate the apparatus 1000.

Lock rod 1364—this mechanism is a bar, round, square or other shape, that passes through the two Legs at one end of the apparatus 1000. The lock rod 1364 can be "hooked" at each end (e.g., bent at a 90° or more angle) so that the lock rod 1364 passes through and engages the legs from the sides. The lock rod 1364 can also be a very stiff straight rod that passes straight through holes in the two legs from front to back when they are in the "in use" position; in this implementation, the lock rod 1364 "fixes" the relative position of the legs and the legs cannot open or close (e.g., they cannot rotate) as the geometry (e.g., angles) of the triangle formed but the legs and lock rod 1364 cannot change. The lock rod 1364 can also be a threaded rod that passes through both legs from front to back with the legs held in position by threaded knobs (or nuts or other threaded attachment).

Leg locking chain 1365—this mechanism is a simple chain of sufficient design to handle the load to attach the two legs. On one end, the leg locking chain 1365 will be permanently attached with a loop or other attachment; on the other end the leg locking chain 1365 will be temporarily attached with a hook or other mechanism. When in the "in use" position, the leg locking chain 1365 is fully extended and taught between the two legs.

Leg locking cable 1366—this mechanism is a simple cable of sufficient design to handle the load to attach the two legs. On one end, the leg locking cable 1366 will be permanently attached with a loop or other attachment; on the other end the leg locking cable 1366 will be temporarily attached with a hook or other mechanism. When in the "in use" position, the leg locking cable 1366 is fully extended and taught between the two legs.

Leg locking hook latch 1367—a bar that is formed in a fashion similar to a screen door hook that rotates at one end attached to one leg and hooks into an eye, loop or other attachment mechanism to the other leg when in the "in use" position.

Leg locking base frame 1368—a flat, rectangular frame that sits on the floor with raised edges at the corners so that the legs of the apparatus 1000 engage the raised edges when in the "in use" position, said raised edges preventing the legs from spreading further. The leg locking base frame 1368 is similar to a picture frame in that it is open in the middle. This leg locking base frame 1368 allows the wheels of the jack being used to easily roll over the leg locking base frame 1368 into the open middle so that the jack is placing no weight on the leg locking base frame 1368, and the leg locking base frame 1368 can easily be positioned exactly under the legs of the apparatus 1000 as the lifted object's weight is lowered onto the apparatus 1000 and thereby onto the leg locking base frame 1368, thereby locking the legs in place. Different from other mechanisms, each apparatus 1000 only required one leg locking base frame 1368 rather than one at each end of the apparatus 1000. The leg locking base frame 1368 may be folded, collapsed or be disassembled for packaging and storing.

Leg locking base plate 1369—similar to the leg locking base frame 1368 above, except that the middle is not open. This mechanism has the disadvantage of having the jack and thereby lifted objects weight on it, and therefore must be in the exact correct location before jacking the object up. The leg locking base plate 1369 may be folded, collapsed or be disassembled for packaging and storing.

Leg locking tray 1373—a "u" shaped tray with ends, notches, pins or other mechanisms that engage the ends of the legs in the "in use" position and keep the legs from moving. There is one leg locking tray 1373 per pair of legs (e.g., one at each end of the apparatus 1000).

Axle to axle cuff lock mechanism 1374—this class of mechanisms engage the axle cuffs 1256 and/or axle tube(s) 1201/axle core tube(s) 1250 such that their rotational position becomes fixed and cannot move. The mechanisms may engage in one position (e.g., the "in use" position) or in two positions (e.g., the "in use" position and the collapsed or stored position). These mechanisms must be of sufficient design and materials such that the force of the leverage of the legs can be safely held in a fixed position.

Leg locking bar latch 1370—a mechanism that is comprised of a bar that engages notches in the axle cuffs 1256 and, by passing through the notches, holds the axle cuffs 1256 and thereby the legs in a fixed angular position. The bar may be affixed to the apparatus 1000 through a variety of methods, including but not limited to springs, pivot points, etc.

Leg to axle locking pins 1371—a mechanism that is a pin that passed through both the axle cuffs 1256 and axle tube(s) 1201/axle core tube(s) 1250 each end of the apparatus 1000. The leg to axle locking pin 1371 effectively locks the legs into a fixed, "in use" position.

Spring loaded axle press button 1372—a spring loaded protuberance on the simple axle assembly 1200 or complex axle assembly 1250 that when in the "in use" position extends through a hole in the axle housing 1150 thereby holding the axle tube(s) 1201/axle core tube(s) 1250 and thereby the axle cuffs 1256 and legs into a fixed, "in use" position.

Alternate embodiments could utilize slots/keyways and keys or spring loaded detents that engage the axles or legs thereby stopping their movement at the desired erect and/or collapsed positions.

These components may be manufactured of a variety of materials, including, but not limited to, steel or aluminum.

In the current preferred embodiment of the leg locking mechanism, the leg latch rotational pin 1359 extends from a single leg at a point between the axle cuff 1256 and the upper leg 1351 end. It is a peg-like extension to which a leg latch 1356 is attached which rotates freely around the leg latch rotational pin 1359. On the opposing leg on the same end of the apparatus 1000 is a leg latch lock pin 1361, which is a similar peg comprised of a narrow neck and a wider head. The leg latch 1356 rotates into position and aligns to the leg latch lock pin 1361, where it thereby locks onto it via the leg latch engagement slot 1358 cut into the end of the leg latch 1356. Squared legs may use straight leg latches 1356, and non-squared legs may use bent leg latches 1356.

There are various alternatives, including, but not limited to, the following:

Another embodiment includes the leg latch rotational pin 1359, the leg latch lock pin 1361, and the leg latch 1356, except that the lock bar's end is hooked, allowing it to lock onto the fixed latch point.

Another embodiment includes a notched leg latch 1356, whereby notches or teeth allow the leg latch 1356 to lock onto the leg latch lock pin 1361 at a single or various points, thus establishing a level of height adjustability.

Another embodiment includes the leg latch rotational pin 1359 and leg latch 1356, but rather than a keyhole latch, a hole is drilled into the end of the leg latch 1356. Instead of a leg latch rotational pin 1359, a hole is drilled through the leg in its place. When the hole in the leg latch 1356 aligns with the hole in the leg, a removable through pin is inserted through the two, thus locking the legs in place.

Another embodiment includes a stop or stops which prevent the leg latches 1356 from rotating to positions which would hinder operation of the apparatus 1000, such as preventing the leg latches 1356 from hanging down and hitting the ground as the apparatus 1000 folds to the collapsed position.

Another embodiment includes a pivoting lock bar 1375 on a sliding cuff 1363, whereby the pivoting lock bar 1375 rotates around the leg latch rotational pin 1359 on one end, while to the other end is attached the sliding cuff 1363 into which travels the length of the opposing leg. When the apparatus 1000 is opened, the sliding cuff 1363 should be at the appropriate locking point, where it locks into place by a spring mechanism or another mechanism suitable for locking the leg cuff into place, such as press buttons or pins.

Another embodiment is the legs may have a hole, or a series of holes, drilled through each of them at precise angles. When the apparatus 1000 is open and the legs are in the proper position, lock rods 1364 may be passed through opposing holes in two of the legs, thus locking the apparatus 1000 into position.

Another embodiment is a locking mechanism whereby leg locking chains 1365 or leg locking cables 1366 are utilized to keep the legs in place. For example, a leg locking cable 1366 may run from one leg to the other, and upon the apparatus 1000 opening and bearing weight, the legs open and take up the slack in the leg locking cable 1366, causing it to become taught, and thus stopping the legs from spreading further, thus securely locking the apparatus 1000 in the open position.

Another embodiment is a locking mechanism whereby the apparatus 1000 is locked by the axle cuff 1256 and axle core tube 1251/axle tube 1201. In this embodiment, a hole exists through the axle cuff 1256 and/or axle core tube 1251/axle tube 1201 and/or axle housing 1150 whereby a complex axle rotation stop pin 1152/simple axle assembly stop pin 1202 can be inserted, thus locking the legs into place.

Another embodiment includes a leg locking base plate 1369, which is a flat plate having insertion points for the ends of the legs of the apparatus 1000, so that when the apparatus 1000 is in the open position, the ends of the legs fit into the plate which now keeps the apparatus 1000 from overextending, thus locking it into position.

Another embodiment includes leg locking trays 1373, in which (using a four-legged apparatus 1000 as an example) two of the legs have trays which hinge on the bottom of the legs. These leg locking trays 1373 lay flat against the legs when in the closed position, but when opened they extend, and the opposing legs sit into the ends of the leg locking trays 1373, thus locking the apparatus 1000 in the open position.

Using similar constructs and components as the 4 leg version of the apparatus 1000, other embodiments can be constructed using various numbers of legs (i.e., a three legged version, a six legged version, etc.).

Example—"in Use" Configuration of an Embodiment

FIG. 1 is a front perspective view of a first embodiment apparatus 1000 in an "in use" configuration. This drawing shows a frontal view of the apparatus 1000 standing up as it would appear "in use", that is erect and with the Legs 1350 locked into position. The lift pad 1101 protrudes from the lift ring 1103 and lift pad base 1104 sitting on top of the axle housing 1150. The axle tubes 1201 protrude out opposing ends of the axle housing 1150 and are not visible, as they are inside the axle cuffs 1256. The legs 1350 are welded to the axle cuffs 1256 and extend downward, angled away from the center point of apparatus 1000. The leg assembly 1350 can rotate to fold for storage, collapse for use in a limited vertical clearance environment and lock into the "in use" position as they appear in this drawing. Leg latches 1356 rotate around the leg latch rotational pins 1359 and connect and lock onto the opposing leg via the leg latch lock pins 1361. There are no feet 1360 on the legs 1350 in this drawing.

Figure 2:
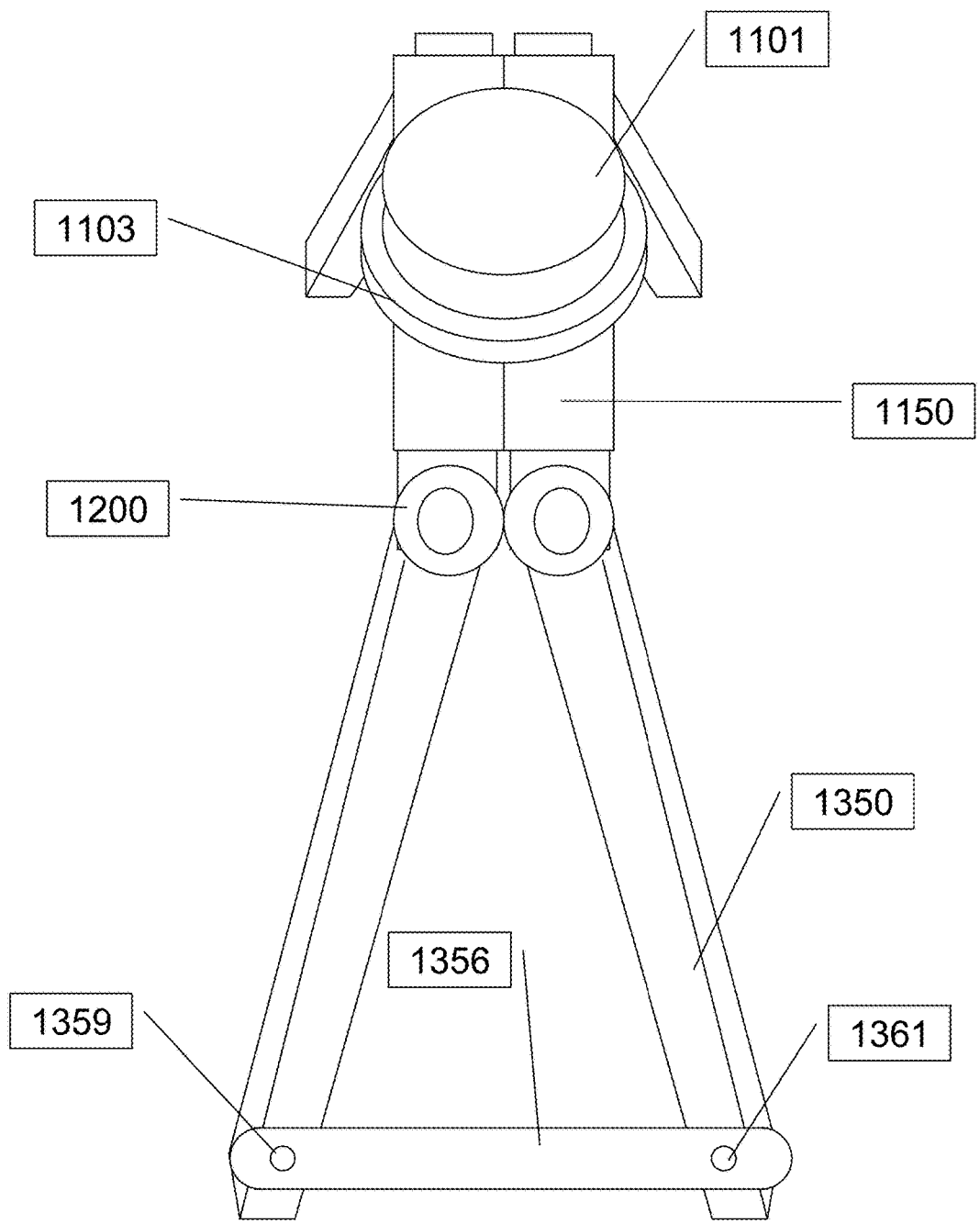
FIG. 2 is an end perspective of the first embodiment apparatus of FIG. 1.

FIG. 2 is an end perspective of the first embodiment apparatus 1000 of FIG. 1. This drawing shows the apparatus 1000 viewed from one end while it is set up and ready for bearing weight. The drawing shows the simple axle assembly 1200, with the lift pad 1101 and lift pad ring 1103 affixed atop the axle housing 1150. The leg assembly 1350 is locked into position via the leg latch 1356, one end of which is attached to the leg assembly 1350 via the leg latch rotational pin 1359 upon which it rotates. The opposite end of the leg latch 1356 attaches to the leg assembly 1350 via the leg latch lock pin 1361.

Figure 3:
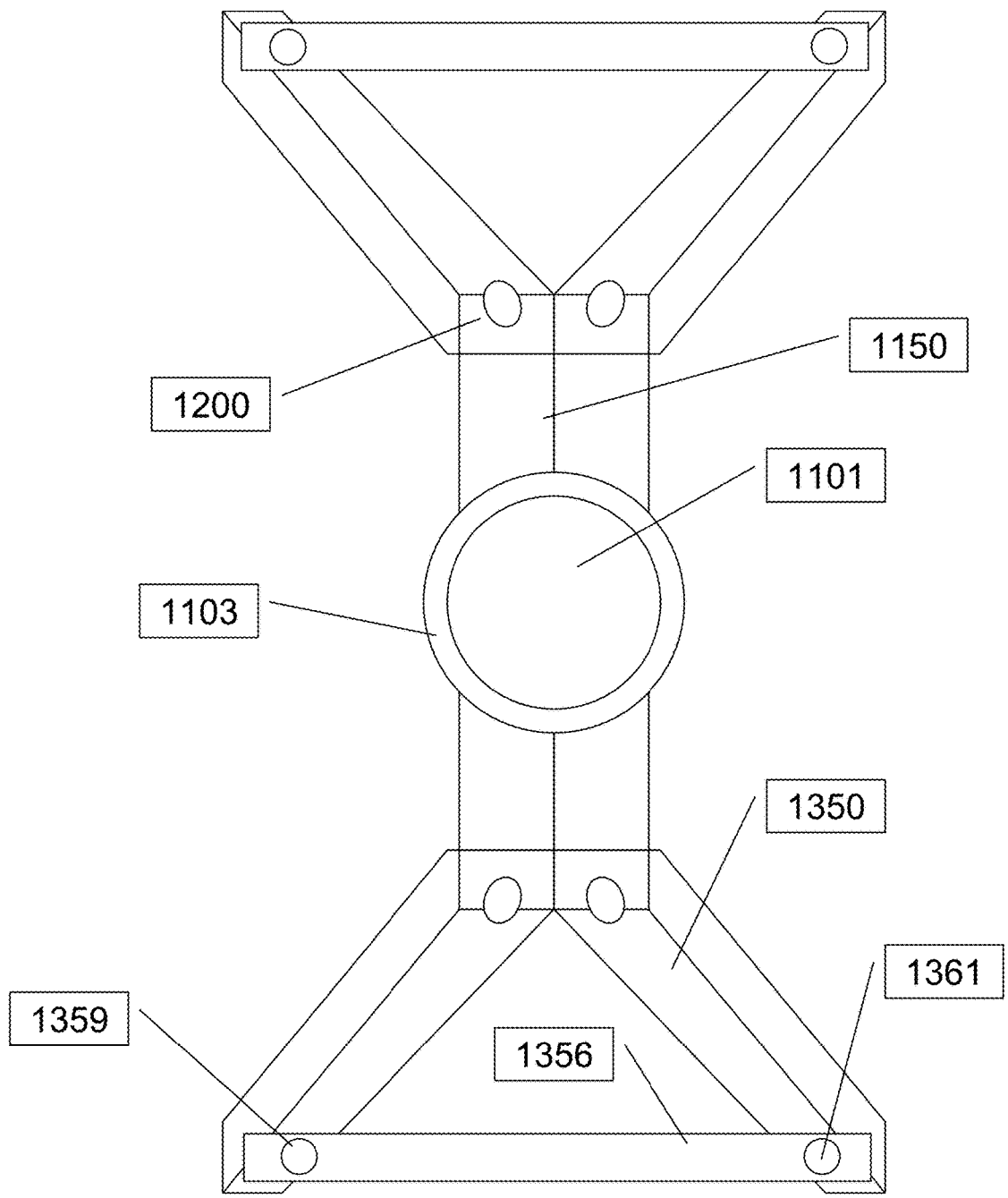
FIG. 3 is a top view of the first embodiment apparatus of FIG. 1.

FIG. 3 is a top view of the first embodiment apparatus 1000 of FIG. 1. This drawing shows the apparatus 1000 from the top while it is set up and ready for bearing weight. The simple axle assembly 1200 is shown. Atop the axle housing 1150, the lift pad 1101 sits within the lift pad ring 1103. The leg assembly 1350 is in a locked position held so via the leg latches 1356 which are affixed on one end to the bottom ends of the leg assembly 1350 via the leg latch rotational pins 1359, the other end then locked onto the leg assembly 1350 via the leg latch lock pins 1361.

Example—Collapsed Configuration of Embodiment with Leg Latch Lock Pins

Figure 4:
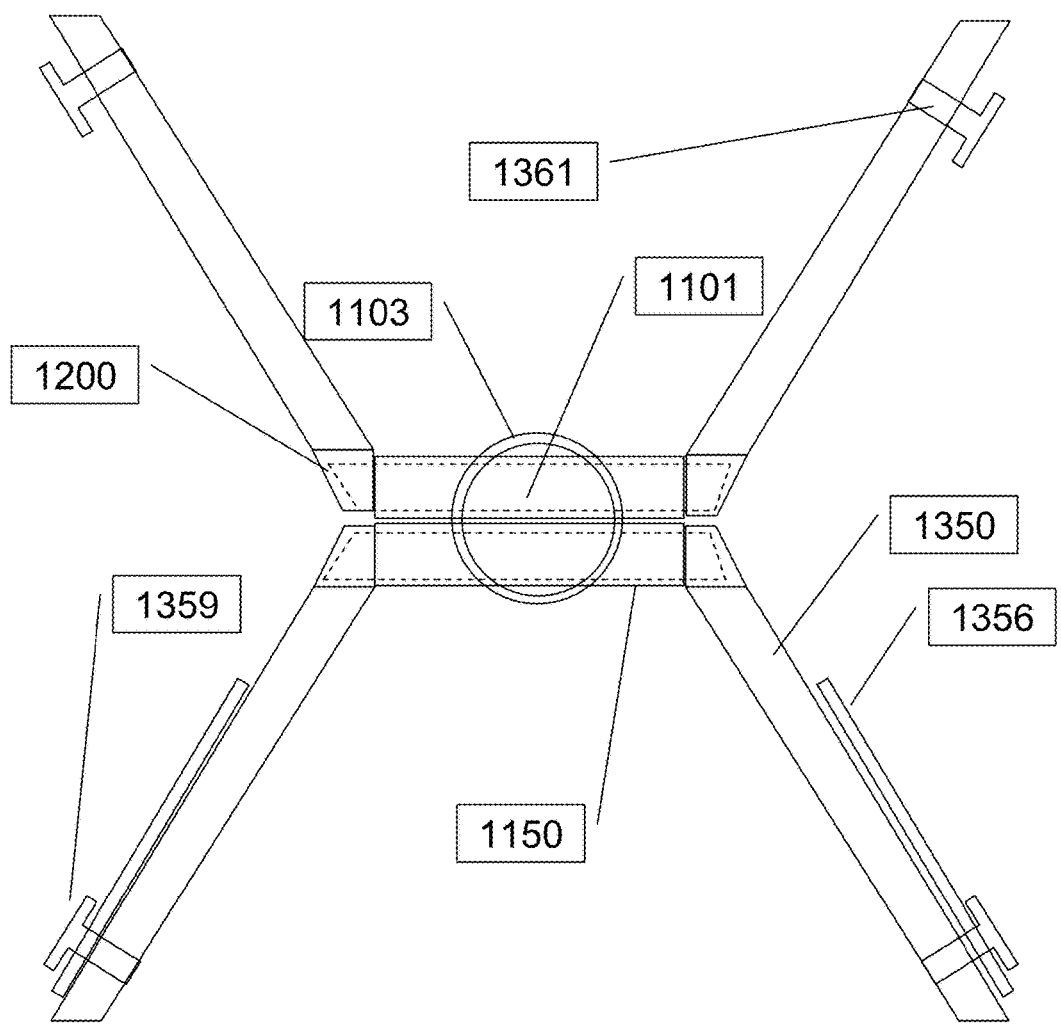
FIG. 4 is a top view of a second embodiment apparatus in a collapsed configuration and ready for jacking.

FIG. 4 is a top view of an apparatus 1000 in a collapsed configuration and ready for jacking. This drawing shows the apparatus 1000 collapsed with the leg assembly 1350 spread out and ready to be placed atop a jack and used to lift an object. The lift pad 1101 and lift pad ring 1103 sit atop the axle housing 1150 of the simple axle assembly 1200. The leg latches 1356 have rotated around the leg latch rotational pins 1359 and are parallel to the leg assembly 1350. Also illustrated are the leg latch lock pins 1361 which are not engaged when the apparatus 1000 is in the collapsed position.

Example—Device Folded for Storage

Figure 5:
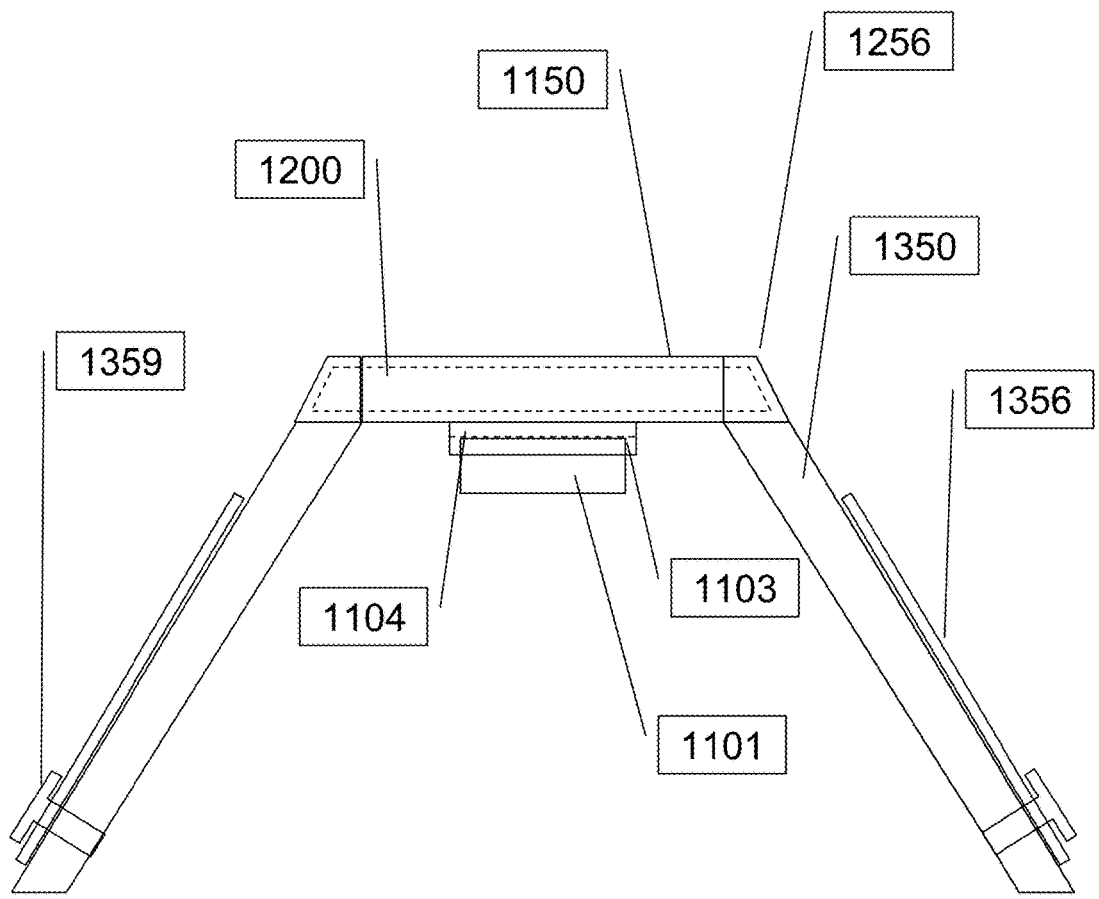
FIG. 5 is a front view of an apparatus folded for storage.

FIG. 5 is a front view of apparatus 1000 folded for storage. The simple axle assembly 1200 has rotated within the axle housing 1150 which is now inverted, with the lift pad 1101, lift pad ring 1103 and lift pad base 1104 facing toward the lower end of the leg assembly 1350, which is attached to the simple axle assembly 1200 via the axle cuffs 1256. The leg latches 1356 have rotated around leg latch rotational pins 1359, and are now parallel to the leg assembly 1350.

Example—"in Use" Configuration of Embodiment with Feet

Figure 6:
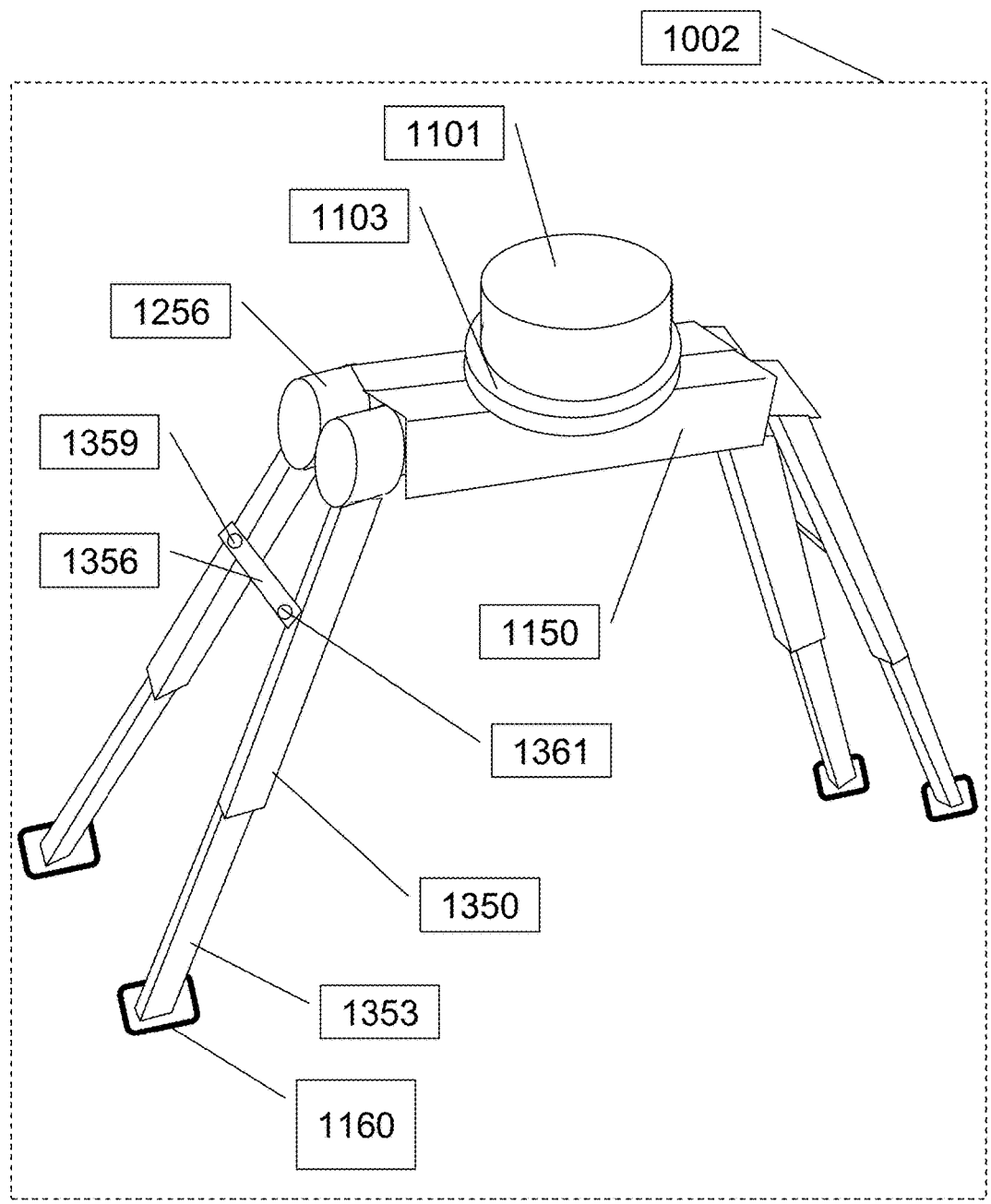
FIG. 6 is a front perspective view of a third embodiment apparatus in an "in use" configuration.

FIG. 6 is a front perspective view of a second embodiment apparatus 1002 in an "in use" configuration. This drawing shows the apparatus 1002 in the upright and locked position, as it would be in use while supporting the weight of a vehicle. The lift pad 1101 rests within the lift pad ring 1103 and atop the axle housing 1150. The lower legs 1353 are extended out of the upper legs 1351 which are affixed to the axle cuffs 1256. At the bottom end of the lower legs 1353 are the feet 1360 of the apparatus 1000. The leg latches 1356 are in the locked position, held on one end by the leg latch rotational pins 1359, and on the other end by the leg latch lock pins 1361.

Example—Simple Axle Assembly with Stop Pin

Figure 7:
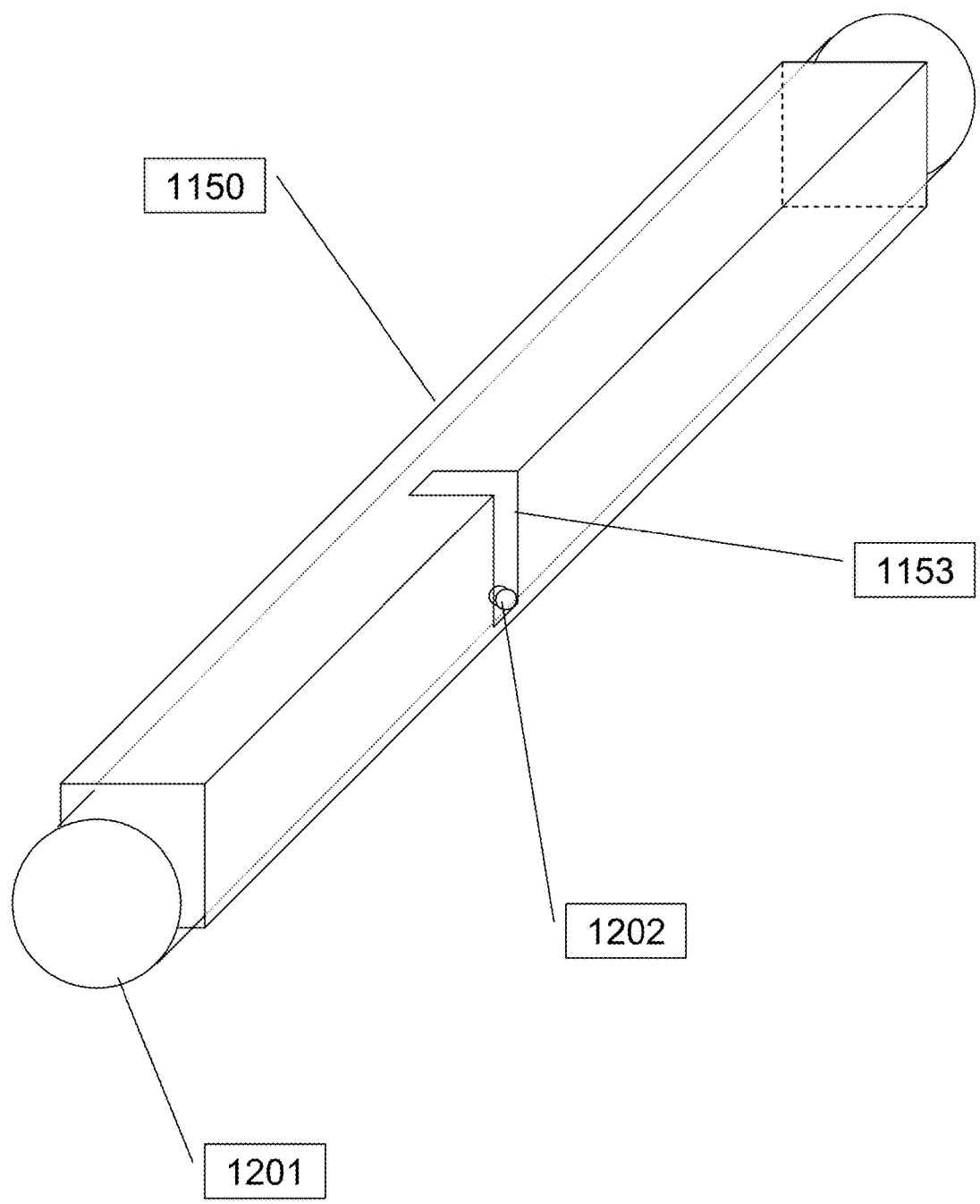
FIG. 7 is a perspective view of one of the two simple axle assemblies with a stop pin.

FIG. 7 is a perspective view of one of the two simple axle assemblies with a stop pin. This drawing shows the detail of one of the two simple axle assemblies with stop pin 1202 on the axle tube 1201 as it would travel in a simple axle rotation limiting slot 1153 on the axle housing 1150 stopping rotation in two directions. The stop pin is one example of an axle rotation limiting element. The axle rotation limiting element stops the rotation of the axle 1201 at one end of rotation in the stored position and in the other end of rotation in the erect in use position which in the preferred embodiment is approximately 175 degrees of rotation.

Example—Axle Housings with Rotation Limiting Slots

Figure 8:
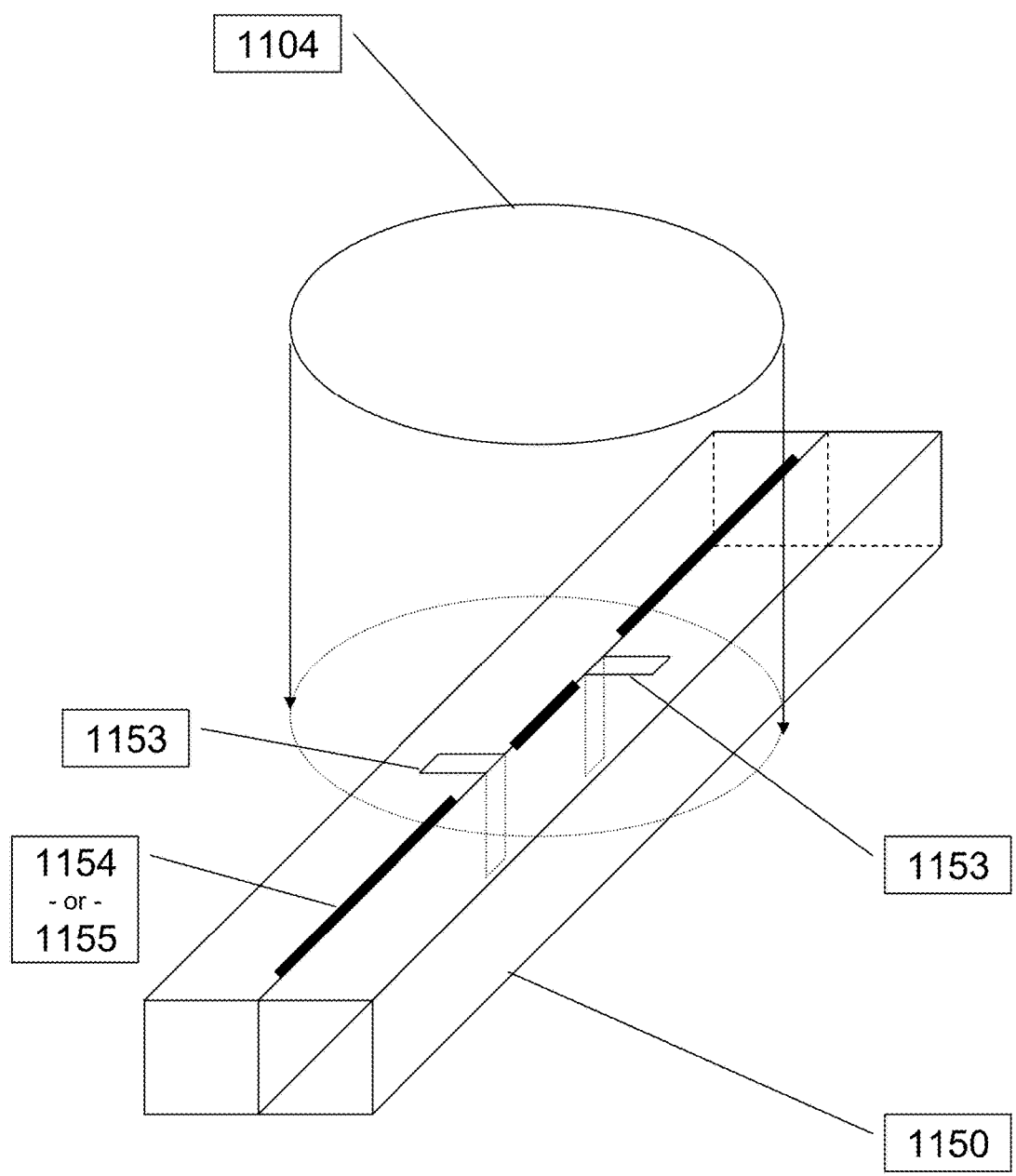
FIG. 8 is a perspective view of axle housings with spacers or strengtheners and rotation limiting slots.

FIG. 8 is a perspective view of axle housings with spacers or strengtheners and rotation limiting slots. This drawing shows an example of simple axle rotation limiting slots 1153 on the axle housing 1150. The slots may be offset or staggered to prevent weakness by cutting the axle housings 1150 at the same place. FIG. 8 shows how the lift pad base 1104 attaches so that the simple axle rotation limiting slots 1153 can be hidden from view, thereby eliminating pinch points for the operator. The lift pad base 1104 also provide additional strength when attached to the axle housings 1150, along with the optional axle housing strengthener 1154 and/or axle housing spacer 1155.

Example—Complex Axle Assembly

Figure 9A:
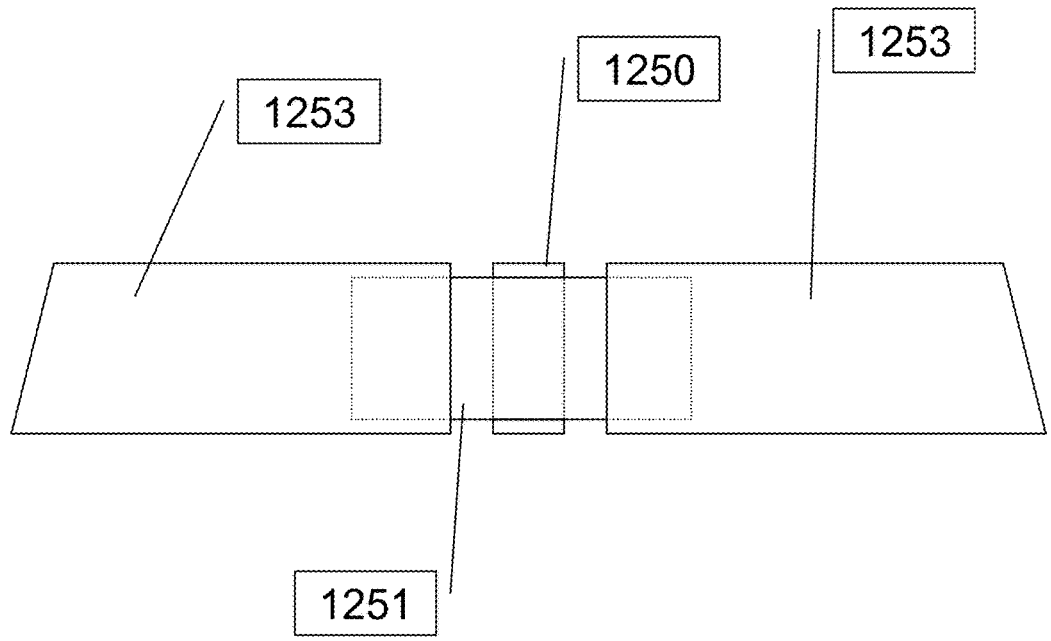
FIG. 9A is a front view of a complex axle assembly.
Figure 9B:
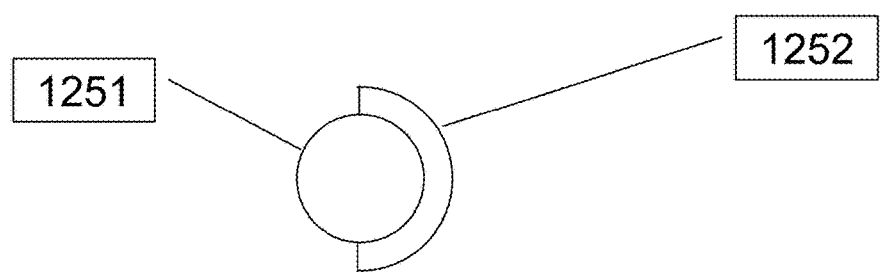
FIG. 9B is a side view of the axle core tube and axle rotation stop cuff of the complex axle assembly of FIG. 9A.

FIG. 9A is a front view of a complex axle assembly. FIG. 9B is a side view of the axle core tube 1251 and axle rotation stop cuff 1252 of the complex axle assembly of FIG. 9A. These drawings show a complex axle assembly 1250 whereby the axle end spacers 1253 are attached to the axle core tube 1251. Also shown is the cross section of the axle core tube 1251 with the axle rotation stop cuff 1252 attached.

Example—Alternate Latch Pin Assembly

Figure 10A:
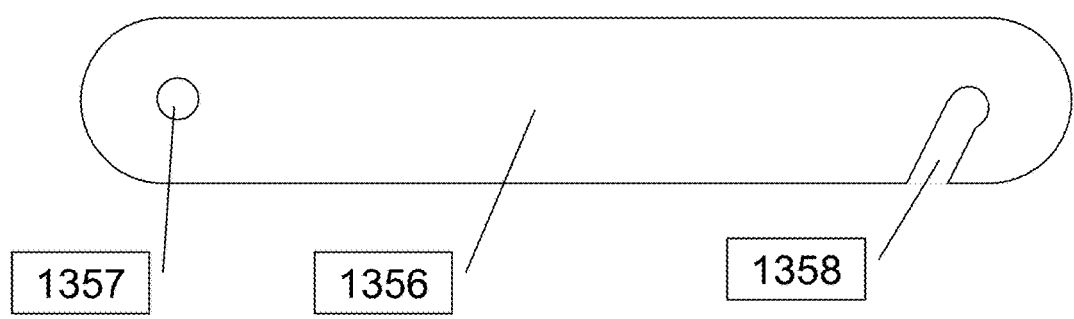
FIG. 10A is a front view of a leg latch.
Figure 10B:
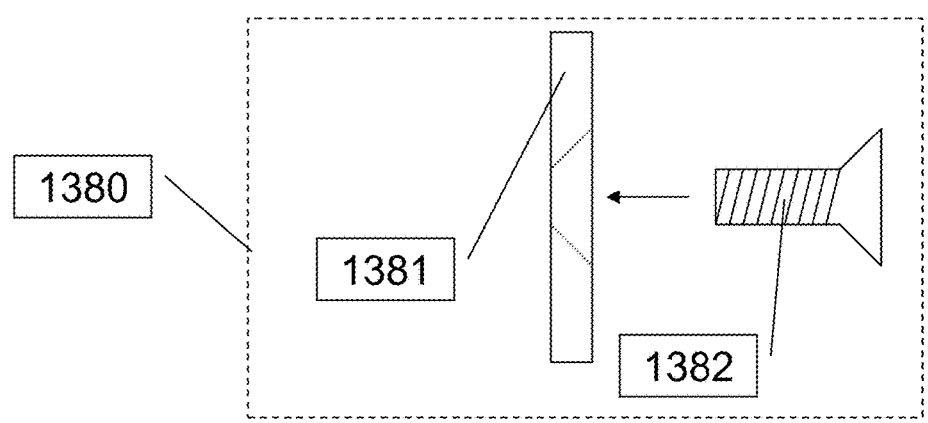
FIG. 10B is a side view of a latch pin aligned with a latch pin base.
Figure 10C:
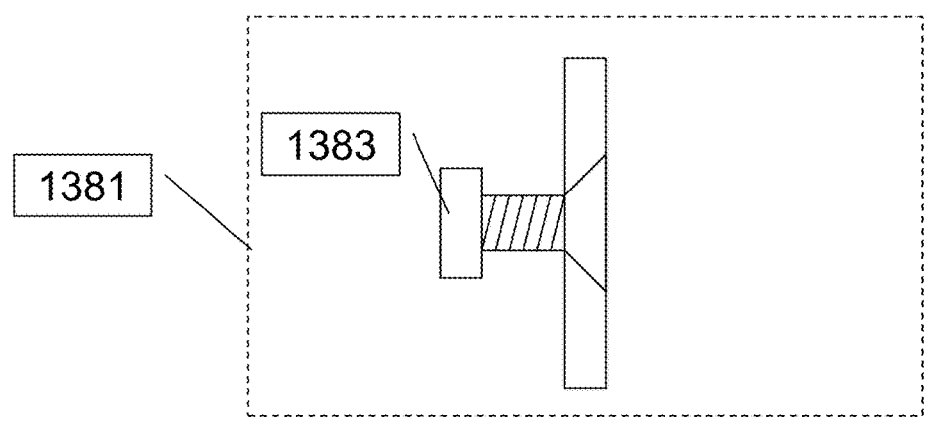
FIG. 10C is a side view of a latch pin partially inserted into the latch pin base of FIG. 10B.

FIG. 10A is a front view of a leg latch. FIG. 10B is a side view of an alternate latch pin assembly 1380. The alternate latch pin 1381 is aligned with the hole in the alternate latch pin base 1381. FIG. 10C is a side view of an alternate latch pin partially inserted into the alternate latch pin base of FIG. 10B. FIG. 10A is a front view of a alternate latch pin 1382 which provides a larger attachment welding surface through the use of an alternate latch pin base 1381 These drawings show the leg latch rotational hole 1357 on one end of the leg latch 1356, and the leg latch engagement slot 1358 on the opposite end. Also illustrated is the alternate latch pin 1382 which passes through, until flush with, the alternate latch pin base 1381, the end of which is then capped by the alternate latch pin cap 1383 to be used to secure the leg latch 1356 on either end, or both ends simultaneously, when engaged. This alternate design would allow the pins that the leg lock bars rotate on and engage on when locked to be welded to the outside of the legs, rather than penetrating through the legs. This would allow the leg lock bars to be further down on the legs even when extensible legs are used.

Example—Cable Synchronization of Leg Movement

Figure 11A:
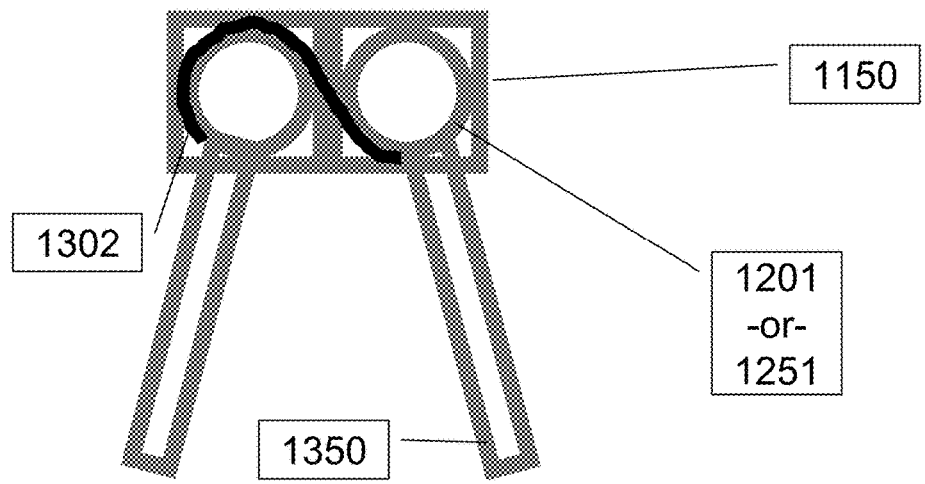
FIG. 11A is an end view of an erect position of legs and an axle synchronization cable.
Figure 11B:
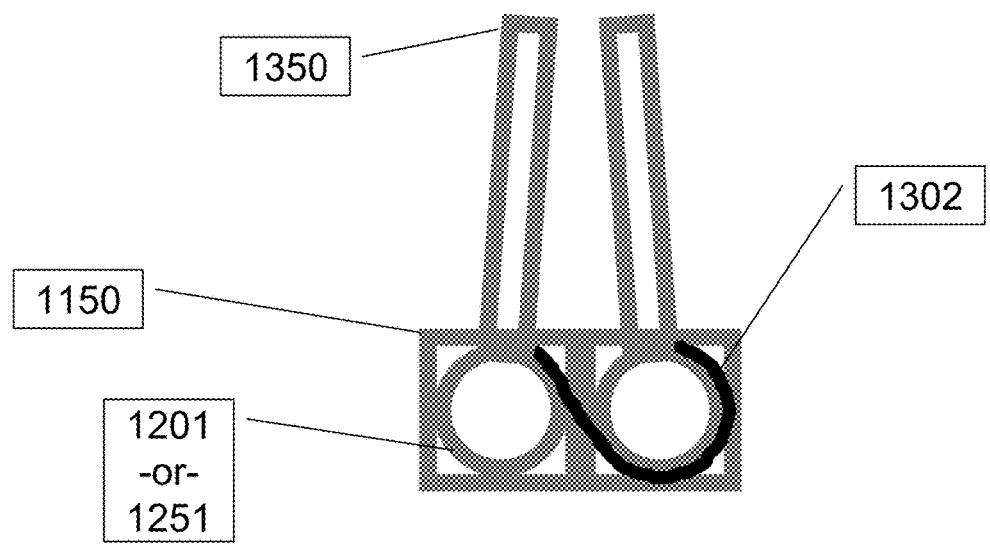
FIG. 11B is an end view of a stored position of legs and an axle synchronization cable.

FIG. 11A is an end view of an erect position of legs and an axle synchronization cable. FIG. 11B is an end view of a stored position of legs and an axle synchronization cable. These drawings show the apparatus in both the stored & erect positions and the relative cable positions/paths of both. In FIG. 11A the apparatus is shown in the erect position, whereby the axle synchronization cables 1302 are affixed to the axle tube 1201 or axle core tube 1251 (depending upon whether the cable mechanism is used in the simple or complex axle assembly). In FIG. 11B the apparatus is shown in the storage position with the legs 1350 rotated toward each other until to minimize the size of the folded device.

Examples—Gear or Sprocket Synchronization of Leg Rotation or Leg Rotation Stop

Figure 12A:
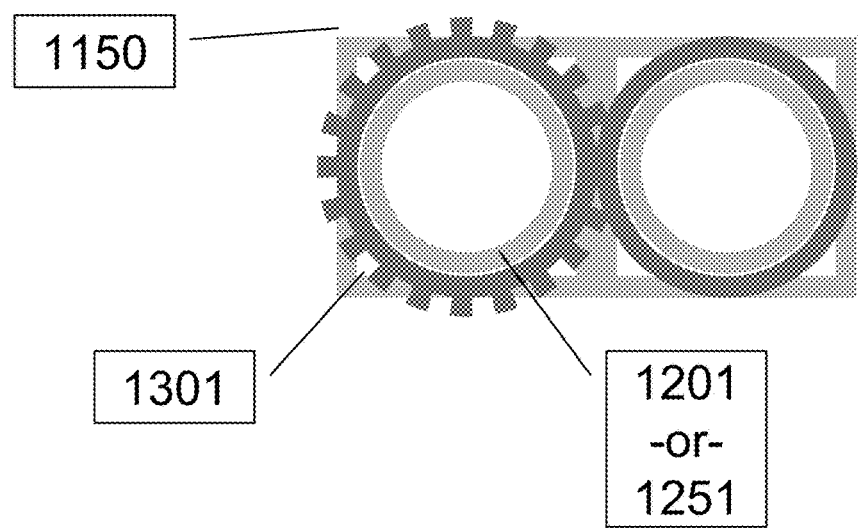
FIG. 12A is an end view of a gear or sprocket synchronization of leg rotation.
Figure 12B:
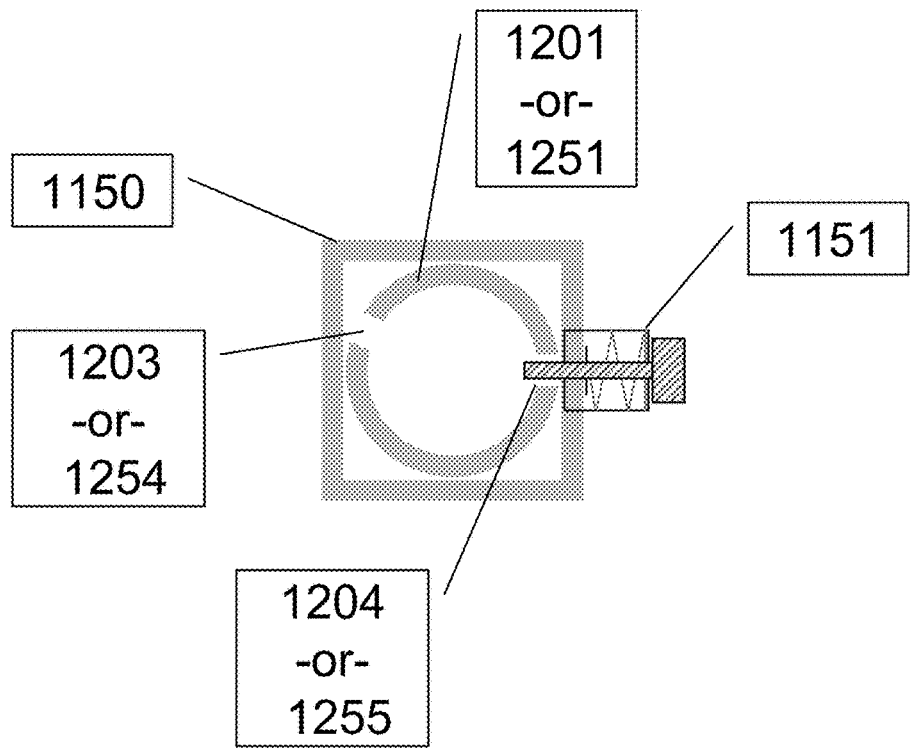
FIG. 12B is an end view of a leg rotation stop.

FIG. 12A is an end view of a gear or sprocket synchronization of leg rotation. FIG. 12B is an end view of a leg rotation stop. These drawings show the gear/sprocket mechanisms that synchronize the leg rotation, and the mechanism that stops the legs and holds them when at a designated position.

FIG. 12A shows one of the axle tubes 1201 or axle core tubes 1251 with the axle synchronization gear/sprocket 1301 affixed, while the parallel axle tube 1201 or axle core Tube 1251 has recesses to fit the teeth of the Synchronization Gear/Sprocket 1301 in order to synchronize the leg rotation. Both axle tubes 1201 or axle core tubes 1251 are shown within the axle housing 1150.

FIG. 12B illustrates a axle tube 1201 (or axle core tube 1251) within the axle housing 1150, whereby there is a simple axle plunge pin stored position hole 1203 (or complex axle plunge pin stored position hole 1254) within the axle tube 1201 (or axle core tube 1251). Also within the axle tube 1201 (or axle core tube 1251) is a simple axle plunge pin in use position hole 1204 (or complex axle plunge pin in use position hole 1255), within which the spring loaded plunge 1151 is engaged to synchronize movement of the leg assembly 1350, and are encased within the axle housing 1150.

Example—Extendible Legs and Locking Mechanism

Figure 13A:
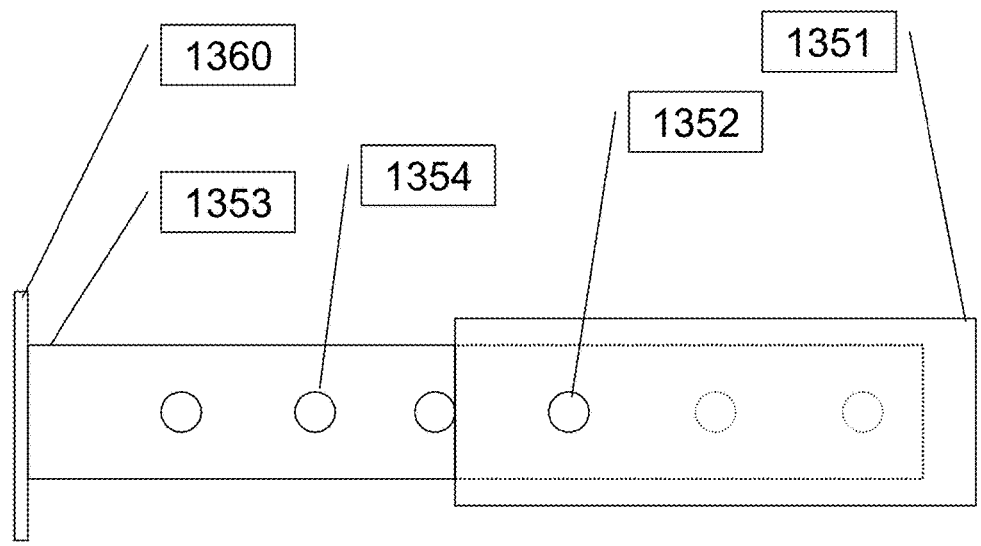
FIG. 13A is a side view of an extendible leg and locking mechanism.
Figure 13B:
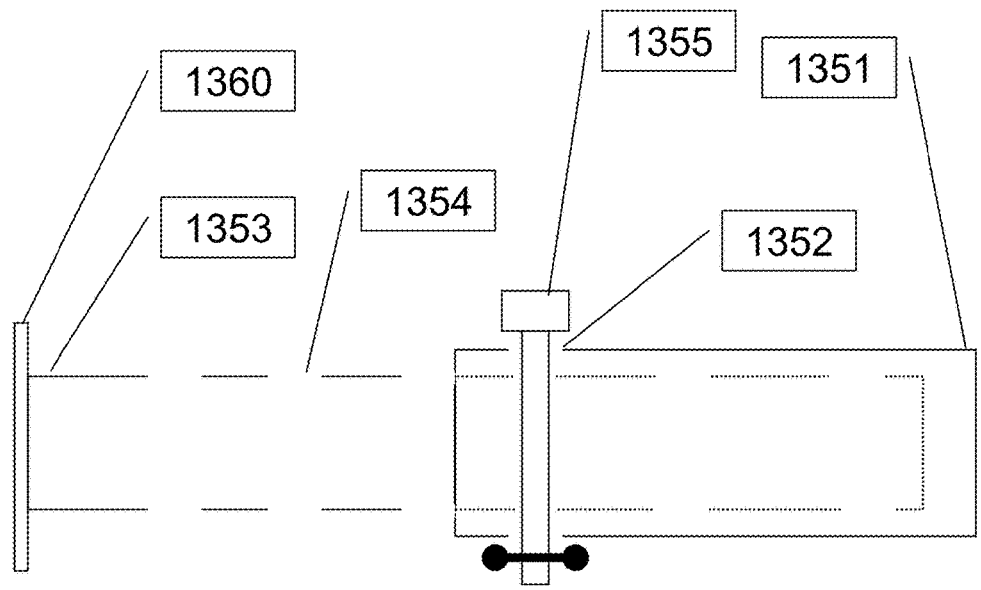
FIG. 13B is a front view of the extendible leg and locking mechanism of FIG. 13A.

FIG. 13A is a side view of an extendible leg and locking mechanism. FIG. 13B is a front view of the extendible leg and locking mechanism of FIG. 13A.

In these drawings, the extendible legs are shown as well as a mechanism which locks them into the desired length. In both drawings, the upper legs 1351 are transparent for the purpose of illustrating the extensibility of the legs and the locking mechanism.

In FIG. 13A, the lower leg 1353 is shown fitted inside of the upper leg 1351 in a telescoping manner. The lower leg 1353 has numerous lower leg extension pin holes 1354, and the upper leg 1351 has a single upper leg extension pin hole 1352.

In FIG. 13B, the depiction in FIG. 13A has been rotated 90 degrees, and the lower leg 1353 (with numerous lower leg extension pin holes 1354) is fitted inside the upper leg 1351. The upper leg 1351 has a leg extension pin 1355 fully inserted through the upper leg extension pin hole 1352 and one of the lower leg extension pin holes 1354, thus fixing the desired length.

Feet 1360 are shown attached to the lower legs 1353 in both drawings.

What is claimed is:

1. A collapsible jack stand comprising
   an axle assembly having a first and a second housing, wherein the first and the second housings are connected and parallel with respect to one another, the first and the second housings having a top portion, a bottom portion, and sidewalls connecting the top portion to the bottom portion, the axle assembly configured to accept a removable jack;
   a first leg assembly connected to the axle assembly and rotatable with respect to the axle assembly, the first leg assembly comprising a first leg, a second leg, and a first axle connecting the first leg to the second leg, wherein the first axle is substantially enclosed within the first housing of the axle assembly and allows for rotation of the first leg assembly with respect to the axle assembly;

a second leg assembly, spaced apart from the first leg assembly and connected to the axle assembly and rotatable with respect to the axle assembly, the second leg assembly comprising a third leg, a fourth leg and a second axle connecting the third leg to the fourth leg, wherein the second axle is substantially enclosed within the second housing of the axle assembly and allows for rotation of the second leg assembly with respect to the axle assembly; such that the jack stand is configurable in a collapsed orientation where the first leg assembly, the second leg assembly, and the axle assembly are aligned substantially in a plane, and the jack stand is configurable in an erect orientation where the first leg assembly and the second leg assembly support the axle assembly in an elevated position;

a leg locking element or mechanism; and a lift pad assembly supported by the top portion of the first and second housings, the lift pad assembly comprising a lift pad, wherein the angle of the lift pad assembly is adjustable with respect to the top portions of the first and second housings.

2. The collapsible jack stand of claim 1 wherein the lift pad assembly is moveable along the top portions of the first and the second housings.

3. A collapsible jack stand comprising an axle assembly having a first and a second housing, wherein the first and the second housings are connected and parallel with respect to one another, the first and the second housings having a top portion, a bottom portion, and sidewalls connecting the top portion to the bottom portion, wherein the axle assembly is configured to accept a removable jack;

a first leg assembly connected to the axle assembly and rotatable with respect to the axle assembly, the first leg assembly comprising a first leg, a second leg, and a first axle connecting the first leg to the second leg, wherein the first axle is substantially enclosed within the first housing of the axle assembly and allows for rotation of the first leg assembly with respect to the axle assembly;

a second leg assembly, spaced apart from the first leg assembly and connected to the axle assembly and rotatable with respect to the axle assembly, the second leg assembly comprising a third leg, a fourth leg and a second axle connecting the third leg to the fourth leg, wherein the second axle is substantially enclosed within the second housing of the axle assembly and allows for rotation of the second leg assembly with respect to the axle assembly; such that the jack stand is configurable in a collapsed orientation where the first leg assembly, the second leg assembly, and the axle assembly are aligned substantially in a plane, and the jack stand is configurable in an erect orientation where the first leg assembly and the second leg assembly support the axle assembly in an elevated position;

a leg locking element or mechanism; and a lift pad assembly supported by the top portion of the first and second housings, the lift pad assembly comprising a lift pad.

4. The collapsible jack stand of claim 3 wherein the lift pad comprises one or more of a flat top,
a dished top, a
waffle top,
a slotted top, a
smooth top, a
ridged top,
a "V" notched top,
or other top formation configured to accommodate a lifting point of an item.

5. The collapsible jack stand of claim 3 wherein the leg locking mechanism
comprises a leg latch;
a leg latch rotation pin;
and a leg latch lock pin.

6. The collapsible jack stand of claim 3 wherein the leg locking mechanism comprises at least one of
a pivot lock bar on a sliding cuff; or
lock rods; or
leg locking chains;
or leg locking
cables; or
an axle cuff and axle core tube assembly;
or an axle cuff and axle core tube assembly
a leg locking base; or
leg locking trays.

* * * * *